(12) United States Patent  
Parker

(10) Patent No.: US 10,359,143 B2  
(45) Date of Patent: Jul. 23, 2019

(54) PIPE LINERS AND THE INSTALLATION THEREOF

(71) Applicant: CRALEY GROUP LIMITED, Farnborough, Hampshire (GB)

(72) Inventor: Michael John Parker, Cheshire (GB)

(73) Assignee: Craley Group Limited, Farnborough Hampshire (GB)

( * ) Notice: Subject to any disclaimer, the term of this patent is extended or adjusted under 35 U.S.C. 154(b) by 225 days.

(21) Appl. No.: 15/321,608

(22) PCT Filed: Jun. 30, 2015

(86) PCT No.: PCT/GB2015/051917
§ 371 (c)(1),
(2) Date: Dec. 22, 2016

(87) PCT Pub. No.: WO2016/001659
PCT Pub. Date: Jan. 7, 2016

(65) Prior Publication Data
US 2017/0159869 A1    Jun. 8, 2017

(30) Foreign Application Priority Data
Jul. 3, 2014    (GB) .................................. 1411889.7

(51) Int. Cl.
*B29C 63/34*    (2006.01)
*F16L 55/18*    (2006.01)
(Continued)

(52) U.S. Cl.
CPC ............ *F16L 55/18* (2013.01); *B29C 63/341* (2013.01); *B29C 63/346* (2013.01); *B32B 1/08* (2013.01);
(Continued)

(58) Field of Classification Search
None
See application file for complete search history.

(56) References Cited

U.S. PATENT DOCUMENTS 3,511,734 A    5/1970    Darrow
4,067,765 A    1/1978    Heller
(Continued)

FOREIGN PATENT DOCUMENTS

EP    0551790 A1    7/1993
FR    2542416 A1    9/1984
(Continued)

OTHER PUBLICATIONS

International Search Report for Application No. PCT/GB2015/051917 filed Jun. 30, 2015.
(Continued)

*Primary Examiner* — Monica A Huson
(74) *Attorney, Agent, or Firm* — Notaro, Michalos & Zaccaria P.C.

(57) ABSTRACT

A pipe liner has an elongate duct of thin laminated thermoplastic layers and remains relatively flexible and folded to a flat form. In this form, opposing sides of the duct are pressed into close proximity aided by folding of the duct, so the liner can be stored efficiently. In use, the liner is inserted into a pipe. The liner is subsequently heated and pressed against the inner surface of the pipe to form a close fit. Once the liner cools, it sets in place providing a close fitting pipe lining. In order to ensure adequate and even heating of the pipe liner during installation, heating is provided within the liner. The heating may comprise: a plurality of conductive filaments; electromagnetic susceptor material; or a plurality of magnetic particles.

23 Claims, 8 Drawing Sheets

(51) Int. Cl.
    *F16L 55/165*     (2006.01)
    *B32B 5/02*     (2006.01)
    *B32B 5/22*     (2006.01)
    *B32B 5/26*     (2006.01)
    *B32B 7/12*     (2006.01)
    *B32B 27/08*     (2006.01)
    *B32B 27/30*     (2006.01)
    *B32B 27/32*     (2006.01)
    *B32B 27/34*     (2006.01)
    *B32B 27/40*     (2006.01)
    *B32B 1/08*     (2006.01)
    *B29L 23/00*     (2006.01)

(52) U.S. Cl.
    CPC .................. *B32B 5/02* (2013.01); *B32B 5/22* (2013.01); *B32B 5/26* (2013.01); *B32B 7/12* (2013.01); *B32B 27/08* (2013.01); *B32B 27/304* (2013.01); *B32B 27/32* (2013.01); *B32B 27/34* (2013.01); *B32B 27/40* (2013.01); *F16L 55/165* (2013.01); *F16L 55/1653* (2013.01); *F16L 55/1654* (2013.01); *F16L 55/1656* (2013.01); *B29L 2023/22* (2013.01); *B32B 2262/0238* (2013.01); *B32B 2262/0253* (2013.01); *B32B 2262/0261* (2013.01); *B32B 2262/0292* (2013.01); *B32B 2262/103* (2013.01); *B32B 2262/106* (2013.01); *B32B 2264/10* (2013.01); *B32B 2264/105* (2013.01); *B32B 2264/107* (2013.01); *B32B 2264/108* (2013.01); *B32B 2307/20* (2013.01); *B32B 2307/202* (2013.01); *B32B 2307/546* (2013.01); *B32B 2597/00* (2013.01)

(56) References Cited

U.S. PATENT DOCUMENTS

| | | | |
|---|---|---|---|
| 4,521,659 | A | 6/1985 | Buckley |
| 4,978,825 | A | 12/1990 | Schmidt |
| 5,606,997 | A | 3/1997 | Blackmore |
| 6,935,376 | B1 * | 8/2005 | Taylor ................. B29C 63/34 |
| | | | 138/104 |
| 2001/0017163 | A1 | 8/2001 | Penza |

FOREIGN PATENT DOCUMENTS

| | | |
|---|---|---|
| WO | 93/02849 A1 | 2/1993 |
| WO | 96/11783 A1 | 4/1996 |
| WO | 96/12605 A1 | 5/1996 |
| WO | 01/94826 A2 | 12/2001 |
| WO | 2005/090848 A2 | 9/2005 |
| WO | 2006/064284 A1 | 6/2006 |

OTHER PUBLICATIONS

United Kingdom Search Report for Application No. GB1411889.7 dated Jul. 10, 2015.

* cited by examiner

PIPE LINERS AND THE INSTALLATION THEREOF

TECHNICAL FIELD OF THE INVENTION

The present invention relates to repair and/or renewal of pipes. In particular, the present invention relates to a pipe liner, a method of installing said pipe liner, and an apparatus for installing said pipe liner.

BACKGROUND TO THE INVENTION

It is common practice to provide utilities, such as water or gas supply or other services including waste water drainage/sewerage along underground pipes. This reduces the obstruction caused by these pipes, particularly in crowded urban areas. It can also provide the pipes with some measure of protection against environmental exposure.

Along with these advantages, there are some disadvantages, in particular, the possibility of damage to the pipes from ground movement, subsidence, increased overhead traffic, tree growth or the like. Another problem with underground pipes is the inconvenience of uncovering or accessing pipes for repair. The access and repair issue has been addressed by inserting a pipe liner, typically formed from a rigid polymer material, along a section of underground pipe. The liner can provide additional structural support for the pipe and may seal cracks, holes or the likes in the existing pipe. Typically, the pipe liner is preformed in a shape substantially corresponding to that of the pipe, but with a slightly narrower diameter. The liner can then be inserted into the pipe. Once in situ, heat expansion can be used to expand the liner into a close fit with the inner surface of the pipe. An alternative method known as swage lining involves reducing the diameter of a liner by pulling it through a die before inserting into a pipe. After insertion, the line will gradually expand back to its original diameter and thereby form a close fit with the inner surface of the pipe.

A further alternative method involves soaking an absorbent fabric pipe liner in resin, inserting said fabric pipe liner into the pipe, pressing the liner against the pipe surface and curing the resin. Typically, the resin is either left to cure gradually or the curing is accelerated using heat and/or ultraviolet light. Where the process is accelerated this can require large amounts of power. There are many variants on such cured in place polymer (CIPP) pipe lining systems, nevertheless, each suffers from the fact that the resin components are typically toxic. As such, soaking the liner material with resin may require a specialised equipment or facilities. Additionally, CIPP liners tend to be very rigid once cured and thus provide minimal flexibility to accommodate subsequent ground or pipe movements.

Whilst the above methods provide for convenient repair/renewal of a pipe, it can be complex and/or costly to apply such a method in many situations. In particular, such preformed liners have limited flexibility which can cause difficulty if the pipe includes multiple bends, variations in diameter. Additional problems may be caused where there are other irregularities in the interior surface of the pipe (from collapse or otherwise) or if there is restricted access to the pipe section to be repaired/renewed. A further significant problem with such liners is storage and convenience of transport or handling. Since the liners typically have limited flexibility, storage and deployment is possible only off a relatively large spindle. Additionally, storage of liners is volumetrically inefficient in view of the significant empty inner volume of the liner.

It is therefore an object of the present invention to provide an improved pipe liner, method of installing a pipe liner and apparatus for installing a pipe liner that overcome or at least alleviate some of the above issues.

SUMMARY OF THE INVENTION

According to a first aspect of the present invention there is provided a pipe liner for use in repair and/or renewal of a pipe, the pipe liner comprising an elongate duct formed from multiple laminated layers of thermoplastic material.

A pipe liner of the claimed type provides excellent pipe lining performance and significantly increased flexibility. Due to the improved flexibility provided by the laminar construction, the pipe liner may be stored in a more volumetrically efficient fashion than preformed prior art pipe liners but without the complexities of handling resin required by CIPP systems. Similarly, the increased flexibility provides for simple insertion of the liner into a pipe without the complexities of handling resin required by CIPP systems.

Preferably, the liner is adapted such that it may have a substantially flat form for storage. Most preferably, this is achieved by folding the liner. In the substantially flat form opposing faces of the liner may be pressed together or into close proximity, this being facilitated by axial folds at opposing sides of the liner profile. The folds may dead folds, sharp folds or may have a curved form. Between the folds, opposing sides of the liner profile may extend substantially parallel to one another. The liner may be formed in the substantially flat form or may be formed in a substantially tubular form then flattened.

Suitable thermoplastic materials for the laminate layers include but are not limited to: high/medium/low density polyethylene (HDPE/MDPE/LDPE), polyvinyl chloride (PVC), unplasticised polyvinyl chloride (PVCu), polypropylene (PP), Nylon66, thermoplastic polyurethane (TU) or the like.

In a preferred embodiment, the laminate layers may be bonded together by the provision of an adhesive there between. The adhesive may be a heat melt adhesive. In alternative embodiments, the laminate layers may be heat bonded.

The laminate layer are preferably thin, say 0.5 to 2 mm or 1 to 2 mm. Typically there are at least 2, and preferably 3 or more laminate layers. In larger pipes there may be more layers. In particular, in some large diameter pipes, whilst there may be 2 to 10 layers, there are preferably 8 to 10 layers. Most preferably, the overall thickness of the liner is of the order of a small percentage of the pipe diameter. Preferably, the overall thickness of the liner is of the order of 2 to 10% or 2 to 5% of the pipe diameter.

The laminate layers may comprise substantially coaxial elongate ducts. Preferably, the laminate layers may be helically wound relative to the elongate axis. Most preferably, successive laminate layers are helically wound in opposing directions. In particular, the layers may be wound in a braided fashion. In such cases, the alternate molecular alignments may increase the strength of the laminated liner. Most preferably, the laminate layers may be formed from dual-orientated polymer (DOP) strips.

The liner may be adapted to comprise a cable duct. The cable duct may be formed from thermoplastic or thermosetting material. Where the cable duct is formed from a thermoplastic material, it preferably has a higher transition temperature than the thermoplastic material forming the laminate layers. The cable duct is preferably provided between two laminate layers. The cable duct may be extruded with an exterior profile adapted to minimise the interstitial gap between laminate layers. In particular, the cable duct may have tapered side wing sections. The cable duct may comprise a microduct, where appropriate.

Provision of the cable duct enables cables to be laid along the duct. The cables may be power cables or data cables. The cables may comprise electrically conductive cables or optical cables.

Heating means may be provided within the pipe liner. Where suitable, the heating means may be provided between successive laminate layers. The heating means enable the pipe liner to be heated above the transition temperature of the laminate layers. This enables the pipe liner to be softened allowing a close fit when pressed against the inner surface of the pipe to achieve a close fit. It also helps achieve consolidation of the laminate layers during pressing.

The heating means may comprise one or more conductive filaments provided between the laminate layers. Preferably, the filaments extend along the length of the pipe liner. By applying an electric current along the filaments, the pipe liner may be heated by resistive heating. The magnitude of the current may be varied. Additionally or alternatively, the applied current may be a pulsed current. In such cases, the duty cycle of the pulsed current may be varied. By varying the magnitude of the current or the duty cycle of the current, the heating of the liner may be controlled. Preferably, the magnitude or duty cycle of the current is varied in response to monitoring means. The monitoring means may be operable to monitor the resistance of the filaments either directly or by inference from the applied current/voltage. The monitored resistance will thereby provide an indication of the temperature of the filaments and hence the temperature of the pipe liner.

In a preferred embodiment, the filaments may be helically wound. Most preferably, equal numbers of filaments are helically wound in opposing directions. In particular, the filaments may be wound in the form of an inter woven braid. This can help the filament structure maintain a desired shape during manipulation of the liner prior to installation. In alternative embodiments, the filaments may be substantially axial or radial or a mixture of axial and radial. Typically the filaments would be formed from a suitable conductive material including, but not limited to: aluminium, copper, carbon fibre or the like.

The heating means may comprise electromagnetic susceptor material. Preferably, the susceptor material is evenly disposed along the length of the pipe liner. Most preferably, the susceptor material is disposed at the interface boundaries between laminate layers. By applying suitable radio-frequency (RF) or microwave (MW) emissions to the pipe liner, the susceptor particles may be heated, thereby heating the pipe liner. The level of heating may be controlled by varying the power of the emissions. Typically the emission will be in within the range of 10 MHz to 2.5 GHz. In preferred embodiments, the emissions may be in standard bands such as 27 MHz or 2.4 GHz.

The susceptor material may comprise a plurality of susceptor particles. The susceptor particles may be provided: within the thermoplastic laminate layers; as a surface coating on the thermoplastic layers; or within an adhesive provided between the thermoplastic layers.

The susceptor particles may comprise: metals such as aluminium, or similar; conductive ceramics or similar; or carbon fibre. The carbon fibre may be provided as chopped strands or woven braids as desired or as appropriate.

The heating means may comprise a plurality of magnetic particles adapted to have a curie temperature corresponding to the transition temperature of the laminate layers. By applying a high frequency magnetic field to the pipe liner, the magnetic particles are heated due to hysteresis losses and thereby heat the pipe liner. Once the magnetic particles are heated beyond the curie temperature, they no longer exhibit magnetic properties and accordingly cease to be heated by the applied high frequency magnetic field. In this manner by selecting the curie temperature of the particles to correspond to the transition temperature of the laminate layers, heating of the pipe liner may be controlled. The size of the magnetic particles is preferably selected so as to minimise joule heating effects caused by circulating currents within each particle.

The magnetic particles may be formed from any suitable material. In a preferred embodiment, the magnetic particles comprise nickel/zinc ferrite. In such embodiments, the curie temperature may be selected by selecting magnetic particles with a desired a desired Nickel: Zinc ratio.

The magnetic particles may be provided: within the thermoplastic laminate layers; as a surface coating on the thermoplastic layers; or within an adhesive provided between the thermoplastic layers.

According to a second aspect of the present invention there is provided a pipe liner for use in repair and/or renewal of a pipe, the pipe liner comprising an elongate duct formed from multiple laminated layers of thermoplastic material and heating means comprising one or more conductive filaments provided between the laminate layers.

The pipe liner of the second aspect of the present invention may incorporate any or all aspects of the pipe liner of the first aspect of the present invention as desired or as appropriate.

According to a third aspect of the present invention there is provided a pipe liner for use in repair and/or renewal of a pipe, the pipe liner comprising an elongate duct formed from multiple laminated layers of thermoplastic material and heating means comprising electromagnetic susceptor material.

The pipe liner of the second aspect of the present invention may incorporate any or all aspects of the pipe liner of the first aspect of the present invention as desired or as appropriate.

According to a fourth aspect of the present invention there is provided a pipe liner for use in repair and/or renewal of a pipe, the pipe liner comprising an elongate duct formed from multiple laminated layers of thermoplastic material and heating means comprising a plurality of magnetic particles adapted to have a curie temperature corresponding to the transition temperature of the laminate layers.

The pipe liner of the fourth aspect of the present invention may incorporate any or all aspects of the pipe liner of the first aspect of the present invention as desired or as appropriate.

According to a fifth aspect of the present invention there is provided a method of installing a pipe liner according to any one of the first, second, third or fourth aspects of the present invention, the method comprising the steps of: inserting the pipe liner into the pipe; heating the pipe liner; and subsequently pressing the pipe liner against the interior surface of the pipe.

The method of the fifth aspect of the present invention may incorporate any or all features of the first four aspects of the present invention, as desired or as appropriate.

The heating step may be achieved using heating means and preferably by heating means as described in relation to the first four aspects of the present invention.

The method may include the step of inserting successive lengths of pipe liner into the pipe. In such cases, the method may include the additional steps of fusing together lengths of pipe liner. The fusion may be achieved by use of an adhesive, or by welding techniques.

The pressing step may be achieved using compressed air or other suitable gas. In order to press using compressed air or other gas, the method may include the additional step of sealing the ends of the liner. The pressing step may additionally or alternatively be achieved using a suitable forming tool inserted into the liner. The forming tool may comprise a suitably adapted pipeline inspection gauge (pig). The forming tool may be operable to activate the heating means in the pipe liner. The forming tool may comprise one or more sprung plates adapted to press outwardly. Pressing can help achieve a consolidation of the heated laminate layers as well as achieving a close fit between the liner and the pipe.

The method may include the additional step of monitoring the temperature of the pipe liner during the heating step. Where the heating means comprise conductive filaments, the monitoring may be achieved by monitoring the electrical properties of the filaments, in particular by monitoring the electrical resistance of the filaments. Where the heating means comprise susceptor material, the monitoring may be achieved by means of an infra red detector positioned so as to monitoring infra red emission from the liner.

The monitoring may be achieved by a dedicated monitoring device. Where the pressing is achieved using a forming tool, the monitoring may be achieved using a monitoring device incorporated into the forming tool.

According to a sixth aspect of the present invention there is provided a method of installing a pipe liner according to the second aspect of the present invention, the method comprising the steps of: inserting the pipe liner into the pipe; heating the pipe liner; and subsequently pressing the pipe liner against the interior surface of the pipe, wherein the pipe liner is heated by applying an electric current along the filaments.

The method of the sixth aspect of the present invention may incorporate any or all features of the first, second and fifth aspects of the present invention, as desired or as appropriate.

According to a seventh aspect of the present invention there is provided a method of installing a pipe liner according to the third aspect of the present invention, the method comprising the steps of: inserting the pipe liner into the pipe; heating the pipe liner; and subsequently pressing the pipe liner against the interior surface of the pipe, wherein the pipe liner is heated by applying radio frequency (RF) or microwave (MW) emissions to the pipe liner.

The method of the seventh aspect of the present invention may incorporate any or all features of the first, third and fifth aspects of the present invention, as desired or as appropriate.

According to an eighth aspect of the present invention there is provided a method of installing a pipe liner according to the fourth aspect of the present invention, the method comprising the steps of: inserting the pipe liner into the pipe; heating the pipe liner; and subsequently pressing the pipe liner against the interior surface of the pipe, wherein the pipe liner is heated by applying a high frequency magnetic field to the pipe liner.

The method of the eighth aspect of the present invention may incorporate any or all features of the first, fourth and fifth aspects of the present invention, as desired or as appropriate.

According to a ninth aspect of the present invention there is provided a master unit for heating a pipe liner according to the second aspect of the present invention or for implementing the method of the sixth aspect of the present invention, the master unit comprising: one or more connectors for forming electrical connections with the conductive filaments of the pipe liner; power output means for applying an electrical current to the connectors; monitoring means for monitoring the characteristics of the applied electrical current and outputting a response thereto; and a control unit for varying the applied electrical current in response to the output of the monitoring means.

The master unit of the ninth aspect of the present invention may incorporate any or all of the features of the first, second, fifth or sixth aspects of the present invention as desired or as appropriate.

The power output means may be operable to output a pulsed electrical current. The power output means may be operable to vary the duty cycle of the pulsed current in response to the control unit. The monitoring unit may be operable to monitor the electrical properties of the conductive filaments between current pulses.

According to a tenth aspect of the present invention there is provided a forming tool for installing a pipe liner according to the third aspect of the present invention or for implementing the method of the seventh aspect of the present invention, the tool comprising: emitting means operable to apply radio frequency (RF) or microwave (MW) emissions to the pipe liner.

The tool of the tenth aspect of the present invention may incorporate any or all of the features of the first, third, fifth or seventh aspects of the present invention as desired or as appropriate.

The emitting means may comprise: an RF amplifier and frequency source; a magnetron; or an antenna. The antenna may comprise a quarter wave antenna, a helical coil or a horn antenna. The antenna may be aligned with the axis of the pipe.

The monitoring means may be operable to monitor the energy emitted by the coil. Alternatively, the monitoring means may comprise one or more infra red detectors.

According to an eleventh aspect of the present invention there is provided a forming tool for installing a pipe liner according to the fourth aspect of the present invention or for implementing the method of the eighth aspect of the present invention, the tool comprising: magnetic means operable to apply a high frequency magnetic field to the pipe liner.

The tool of the eleventh aspect of the present invention may incorporate any or all of the features of the first, fourth, fifth or eighth aspects of the present invention as desired or as appropriate.

The magnetic means may comprise a conductive coil. The coil may comprise a spiral or pancake coil. The specific form of the coil may be adapted to achieve a desired distribution of magnetic energy. In some embodiments the magnetic means may comprise multiple conductive coils. The multiple coils may provide a better distribution of magnetic energy or may be adapted to enable the tool to be used with different sized pipes.

DETAILED DESCRIPTION OF THE INVENTION

In order that the invention may be more clearly understood an embodiment/embodiments thereof will now be described, by way of example only, with reference to the accompanying drawings, of which:

Figure 12:
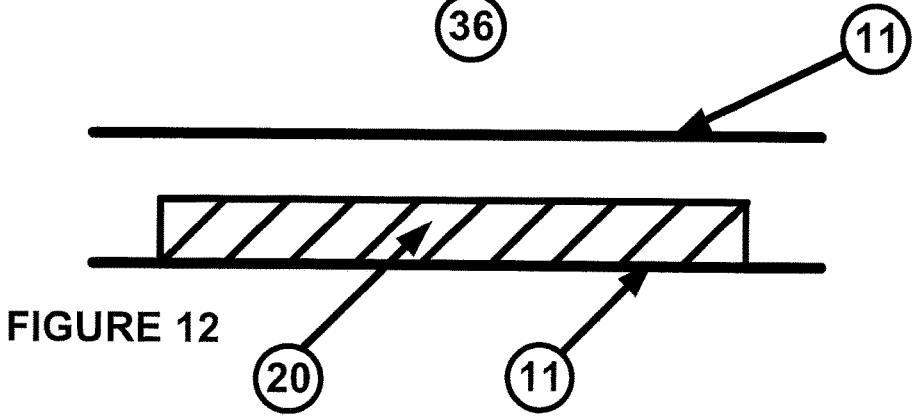
FIG. 12 is a schematic cross-sectional detail illustrating an embodiment of pipe liner according to the present invention provided with susceptor material or magnetic particles.
Figure 14:
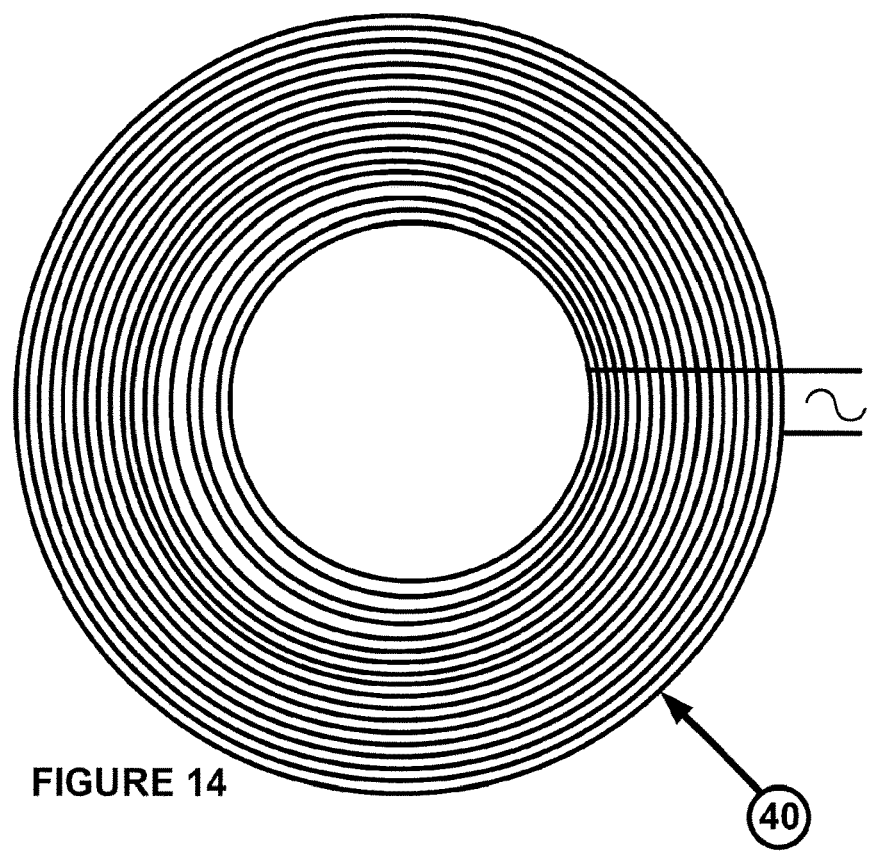
Figure 15:
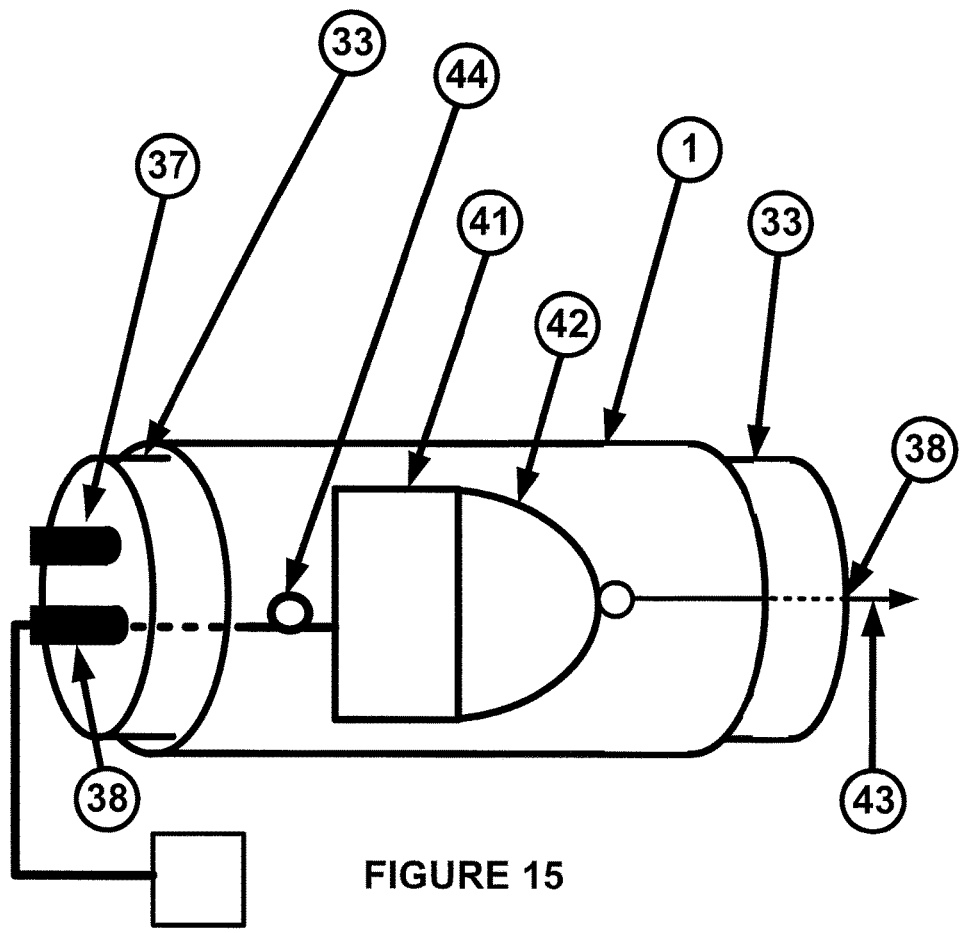

FIG. 13 schematically illustrates potential antennas according to the present invention for applying RF/MW emissions to the pipe liner of FIG. 12;

FIG. 14 schematically illustrates a coil arrangement according to the present invention for applying a high frequency magnetic field to the pipe liner of FIG. 12; and FIG. 15 is a schematic illustration of apparatus according to the present invention for applying the RF/MW emissions of FIG. 13 or the a high frequency magnetic field of FIG. 14.

Figure 1:
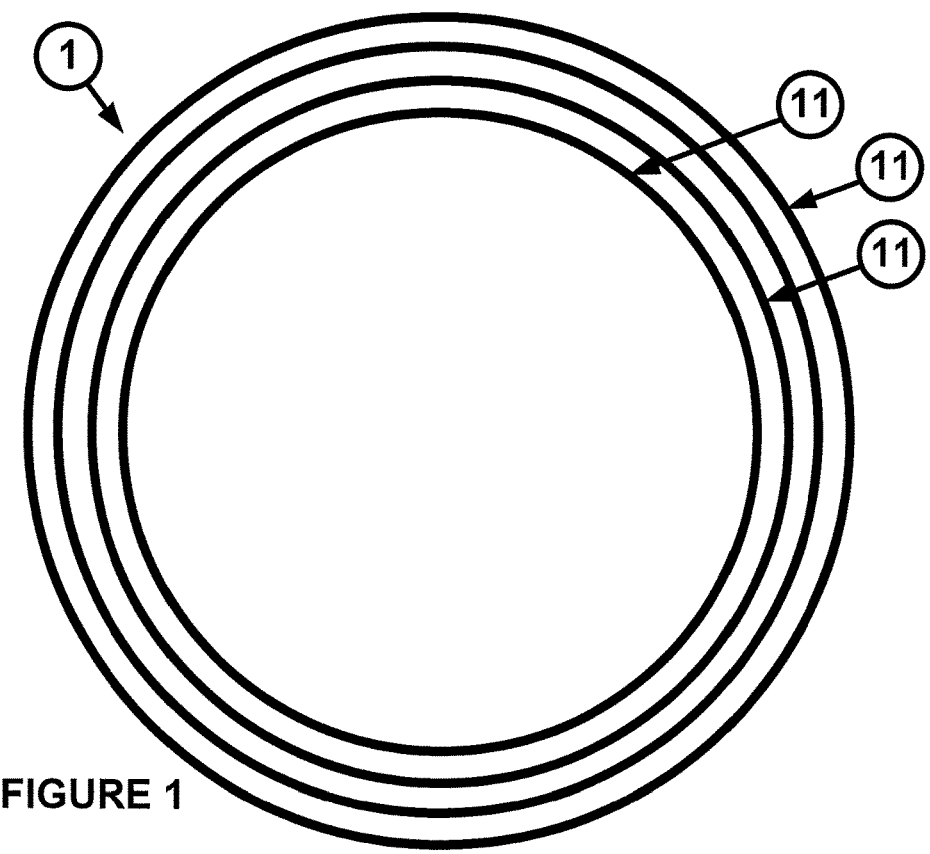
FIG. 1 is a schematic cross-sectional view of a pipe liner according to the present invention.
Figure 2:
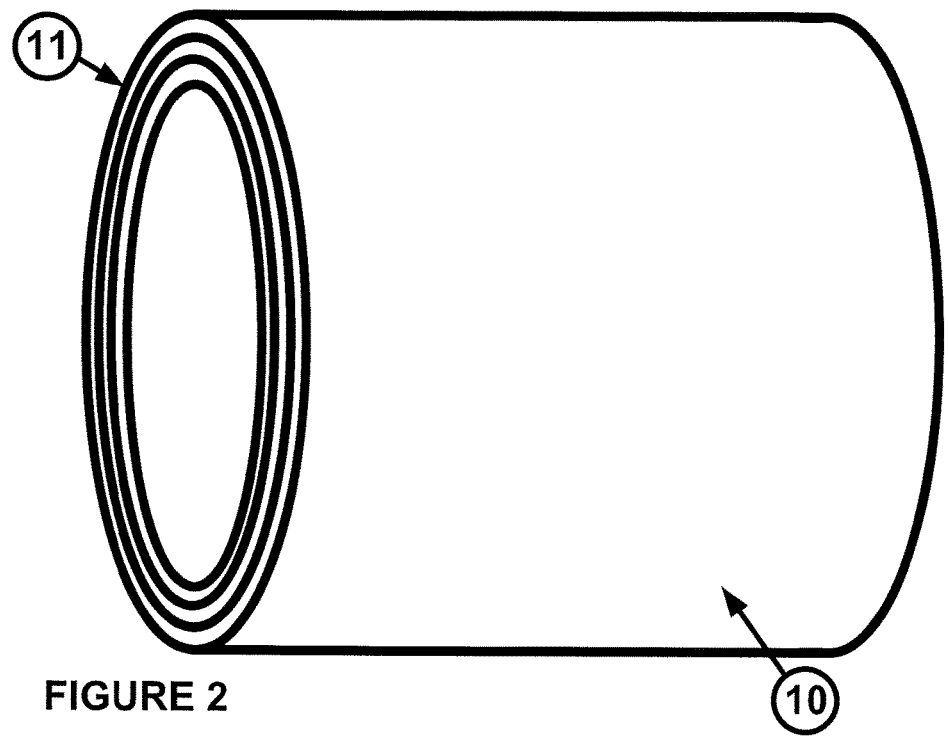
FIG. 2 is a schematic perspective view of a pipe liner of FIG. 1.

Turning now to FIGS. 1 & 2, there is shown a pipe liner 1 according to the present invention. The pipe liner 1 comprises an elongate duct 10 formed from multiple laminated layers 11. Each layer 11 is formed of a thermoplastic material. The layers 11 may be bonded together by adhesive (not shown).

Figure 3:
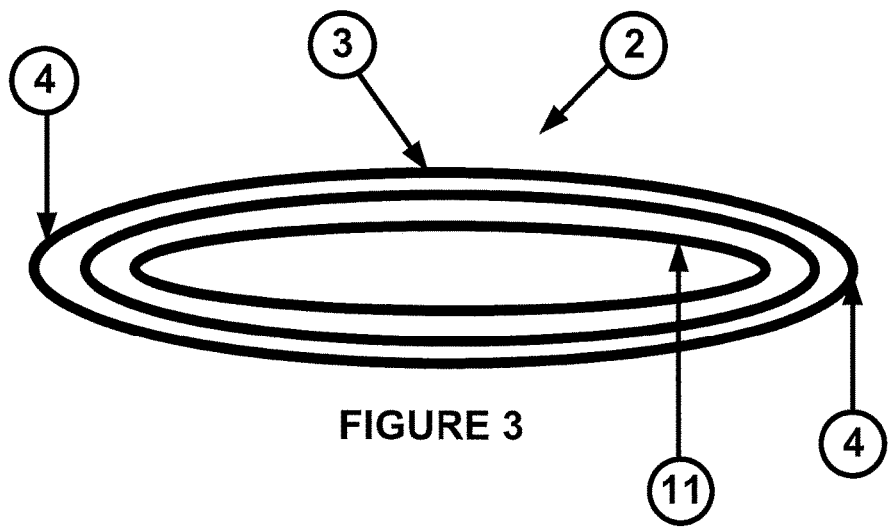
FIG. 3 is a schematic cross-sectional view of the pipe liner of FIGS. 1 and 2 when flattened for storage.
Figure 4:
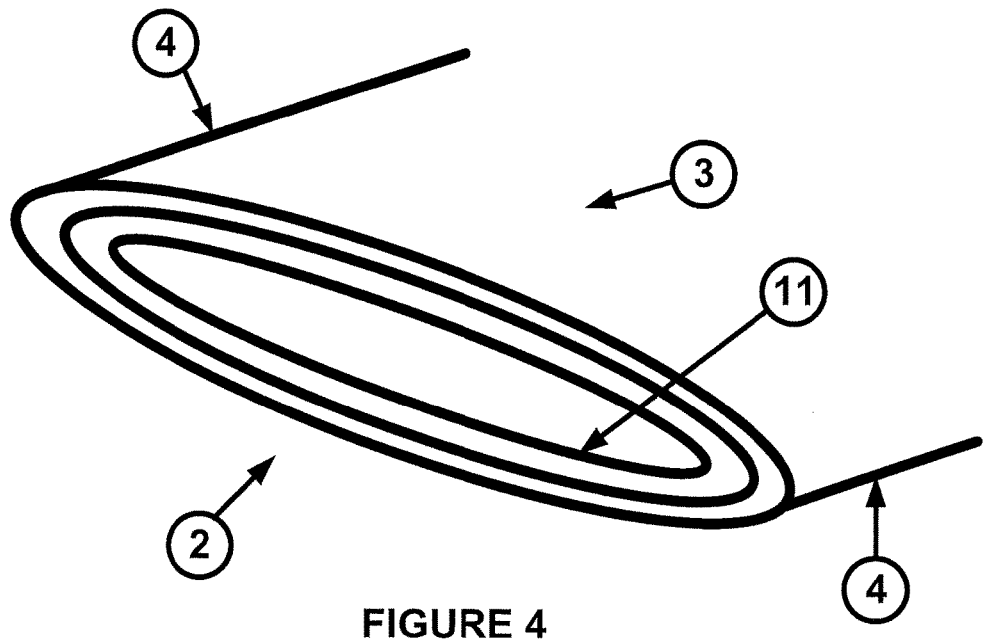
FIG. 4 is a schematic perspective view of the flattened pipe liner of FIG. 3.

The layers 11 are all relatively thin (say 1-2 mm thick). As such, the liner 1 remains relatively flexible and may be folded to a substantially flat form 2 as shown in FIGS. 3 & 4. In this form 2, the opposing sides of the duct 3 are pressed into close proximity aided by folding 4 of the duct 10 at opposing edges. In this manner, the liner 1 can be stored in a more volumetrically efficient fashion than prior art liners. In particular, the flattened liner 2 may be readily wound around a reel or spindle for transport and storage.

Figure 5A:
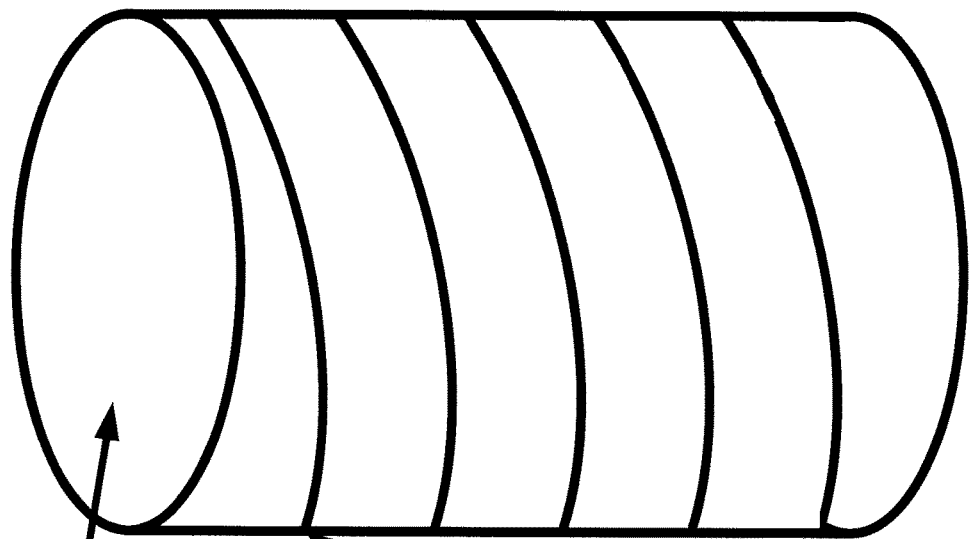
FIG. 5 is a schematic illustration of the manufacture of the pipe liner of FIGS. 1-4.
Figure 5B:
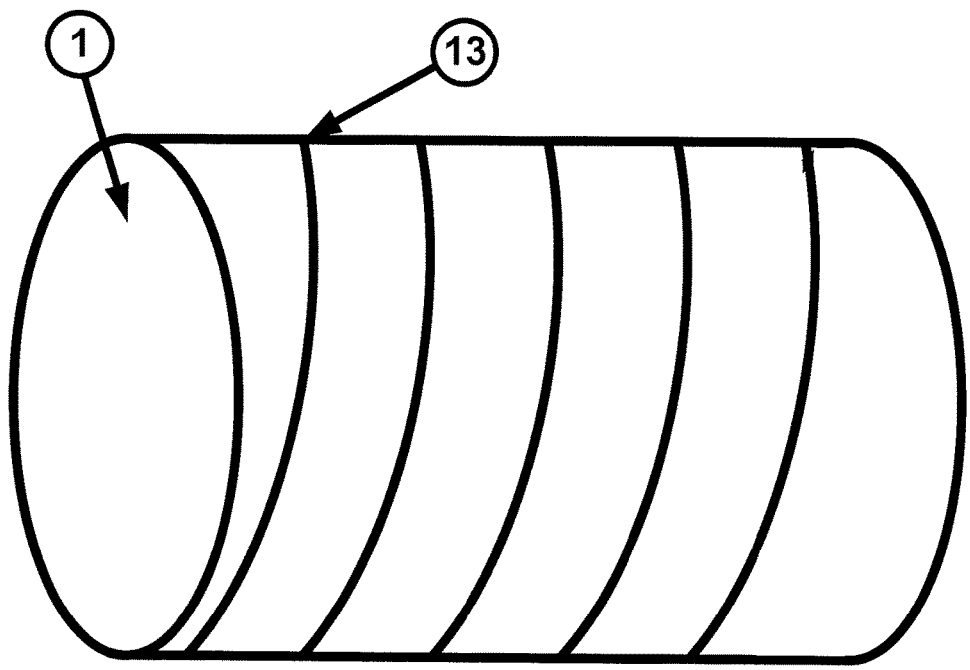

Whilst the liner 1 shown in FIGS. 1-4 is comprised of layers 11 in the form of substantially concentric ducts, in a preferred embodiment shown in FIG. 5, the liner 1 may comprise a series of oppositely wound helical spirals 12, 13. In particular, the winding may take the form of a woven braid.

In use, the liner 1 is inserted into a pipe to be lined. Typically, the liner 1 is deployed in flat form 2 from a reel or spindle and pulled/pushed to the end of the pipe or to a suitable break point in the pipe. The liner 1 is subsequently heated and pressed against the inner surface of the pipe to form a close fit. Once the liner 1 cools, it sets in place providing a close fitting pipe lining. The heating and pressing are discussed in greater detail below.

Figure 6:
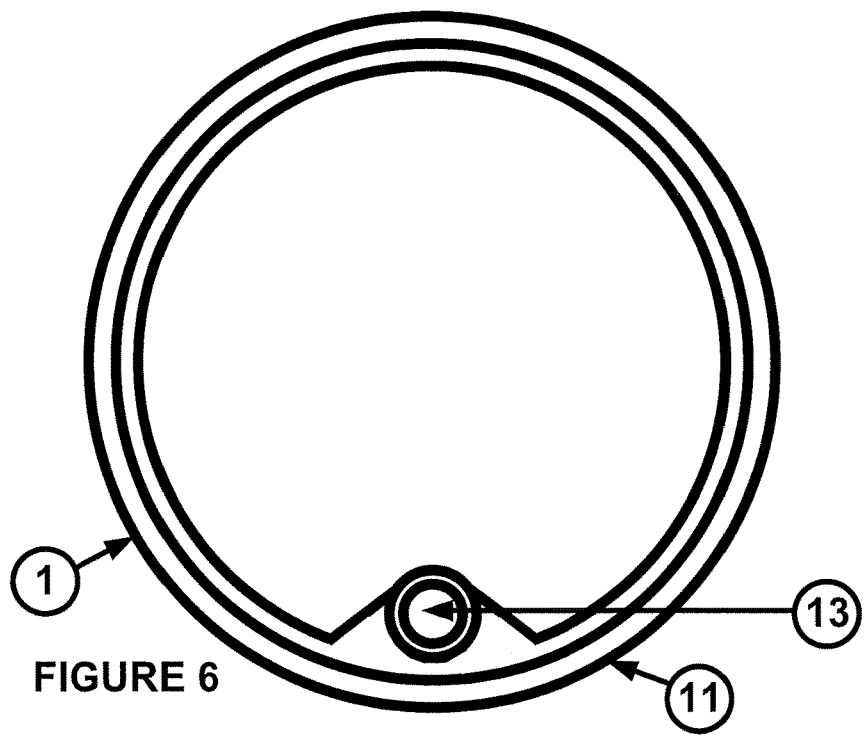
FIG. 6 is a schematic cross-sectional view of an alternative embodiment of a pipe liner according to the present invention wherein the pipe liner incorporates a cable duct.
Figure 7:
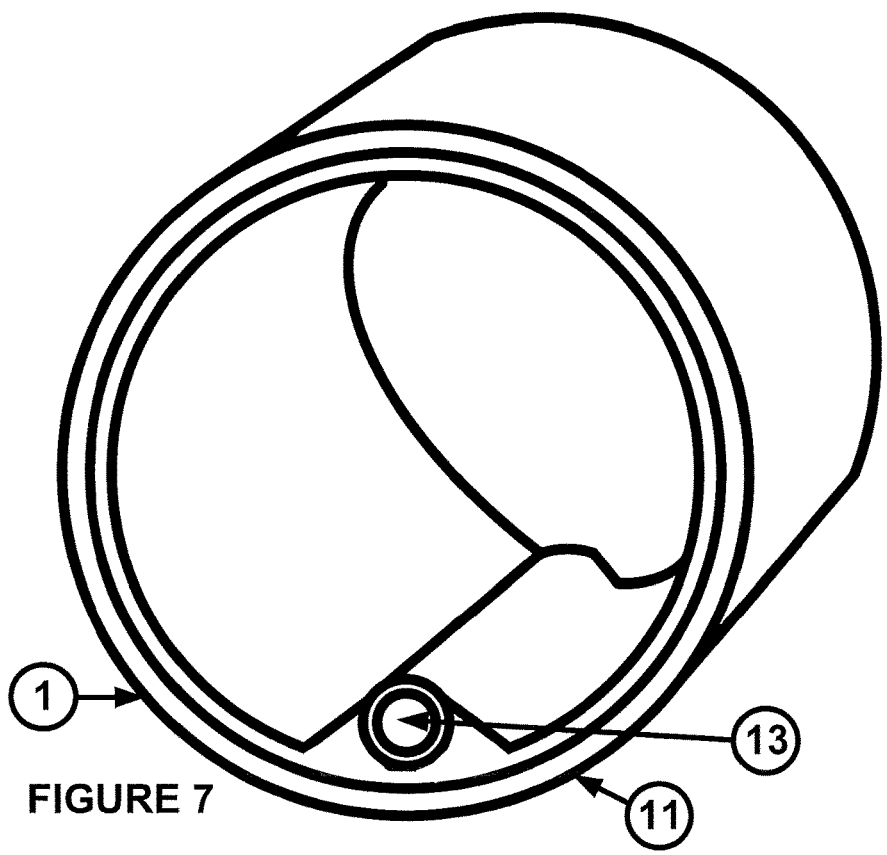
FIG. 7 is a schematic perspective view of a pipe liner of FIG. 6.

Turning to FIGS. 6 & 7 a further embodiment of the pipe liner 1 is shown. In this embodiment, the liner 1 is provided with a cable duct 13 between two laminate layers 11. The cable duct 13 allows for cables to be rapidly installed, typically by being blown along the duct 13 once the pipe liner 1 is in position. The pipe liner 1 therefore both lines the pipe and provides a secure place for cables out of the flow passage of the pipe.

Figure 9:
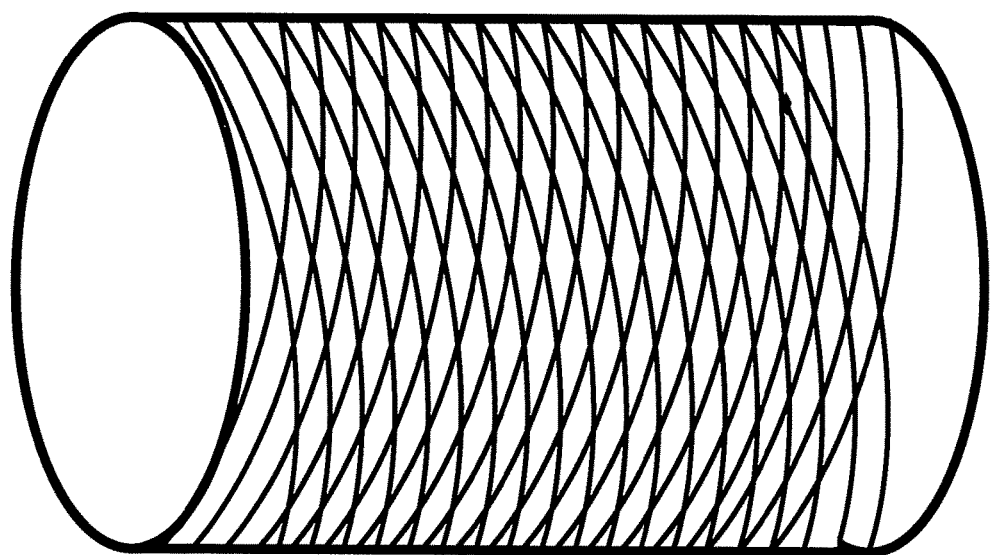
FIG. 9 is a schematic perspective view of the pipe liner of FIG. 8.
Figure 8:
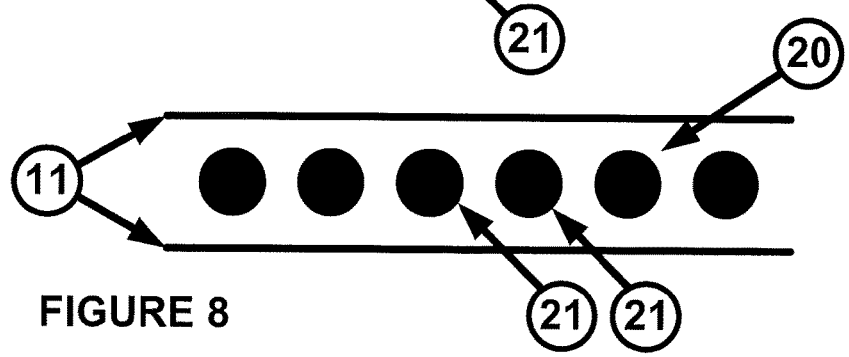
FIG. 8 is a schematic cross-sectional detail illustrating an embodiment of pipe liner according to the present invention provided with one or more conducting filaments.
Figure 10:
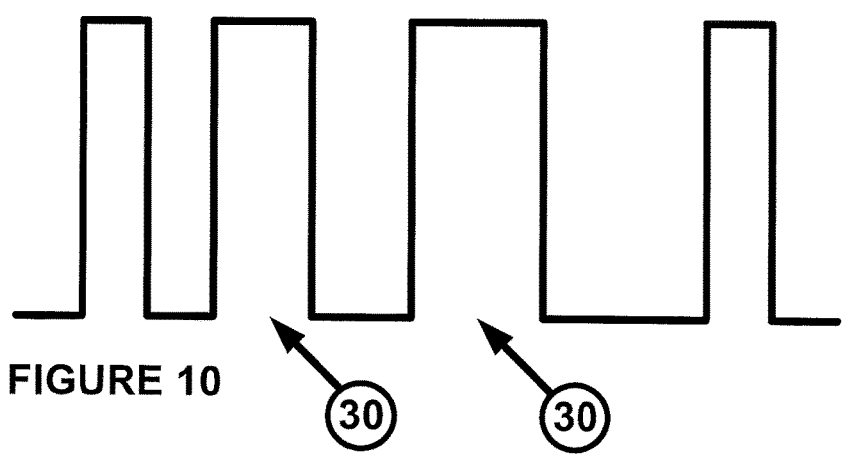
FIG. 10 is a schematic view of the current applied to the filaments of the pipe liner of FIGS. 8 & 9 for heating.

In order to ensure adequate and even heating of the pipe liner 1 during installation, heating means 20 may be provided within the liner 1. In one embodiment, the heating means 20 may comprise a plurality of conductive filaments 21 as shown in FIG. 8. The filaments 21 are provided between the laminate layers 11 and may be helically wrapped in opposing dimensions as shown in FIG. 9. In this manner, the laminate layers 11 may be heated by resistive losses when a current is applied to the filaments 21. In a preferred embodiment, a pulsed current is applied to the filaments 21 as shown in FIG. 10. In order to control the heating of the liner, the resistance of the filaments is monitored between current pulses 30. As the resistance varies predictably with temperature, the variations in resistance can enable the temperature of the liner 1, during heating, to be controlled by varying the duty cycle of the applied current. This is illustrated schematically in FIG. 10 by the varying width and separation of the pulses 30.

Figure 11:
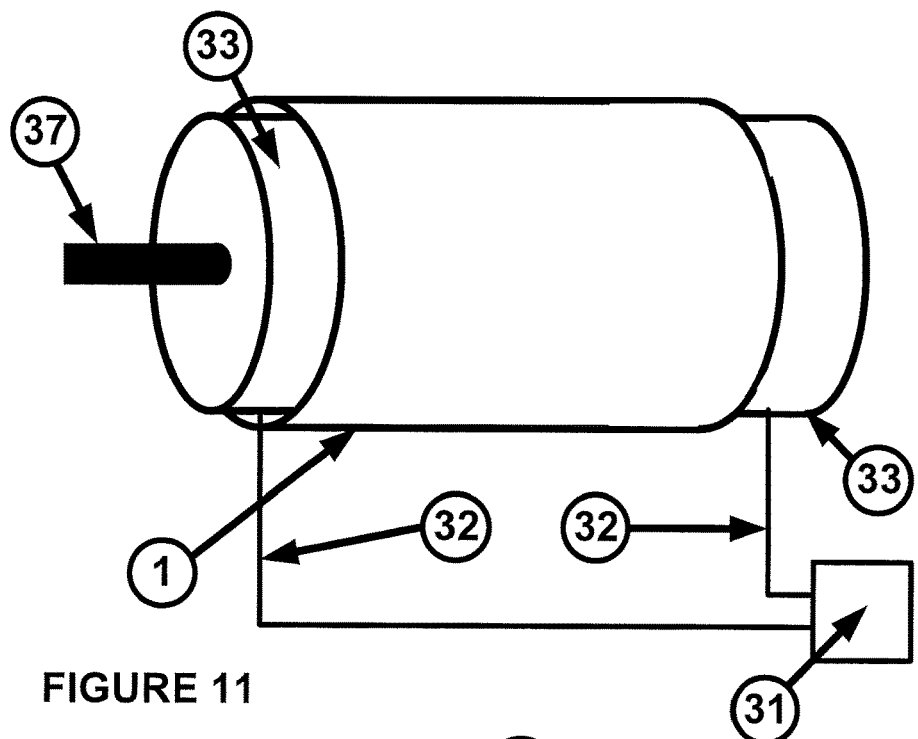
FIG. 11 is a schematic illustration of apparatus according to the present invention for applying the current of FIG. 10.
Figure 11A:
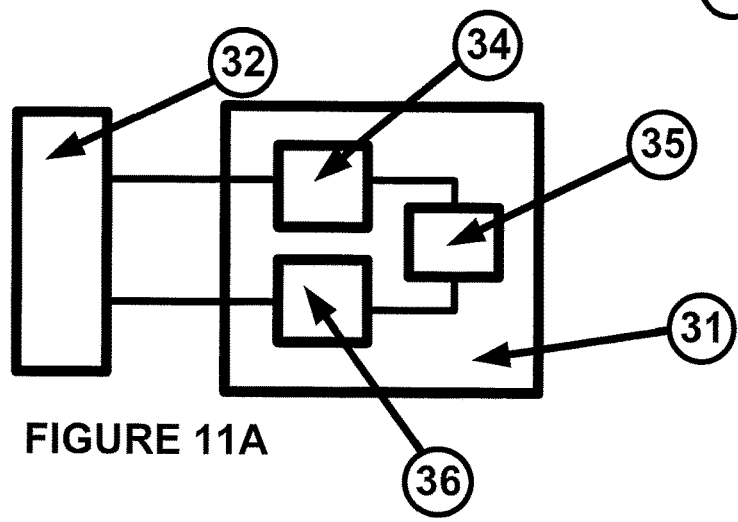
FIG. 11a is a schematic block diagram of the master current unit shown in FIG. 11.

The heating is monitored and controlled by a master unit 31, as shown in FIG. 11 and FIG. 11a. The master unit 31 is provided with connectors 32 for forming electrical connections with the conductive filaments 21 of the pipe liner 1. In this instance, the connectors 32 may further comprise drum sections 33 insertable into the respective ends of the pipe liner 1. The master unit 31 further comprises a power output means 34 for applying an electrical current to the connectors 32; monitoring means 36 for monitoring the characteristics of the applied electrical current and outputting a response thereto; and a control unit 35 for varying the electrical current by the power output means 33 in response to the output of the monitoring means 36. As discussed above, the control unit 35 can be operable to vary the duty cycle of pulsed current. Nevertheless, the control unit 35 may additionally or alternatively vary the magnitude of the current. Furthermore, if the invention is implemented with a steady applied current rather than a pulsed current, the control unit 35 may be operable to vary the magnitude of the steady current.

In order to ensure the pipe liner 1 is adequately pressed against the pipe wall during heating, the drum sections 33 are inserted into respective ends of the pipe liner 1 to form a substantially airtight seal. Air can then be pumped into the sealed pipe liner section via an air inlet valve 37 provided in one of the drum sections 33. After sufficient heating and pressing, the liner can be allowed to cool in place. Subsequently, the air inlet valve 37 can be opened and/or the drum sections 33 removed. Successive lengths of pipe liner 1 may be installed within a long pipe in this fashion. After installation, adjacent lengths of liner 1 may be sealed together by any suitable method, in particular by plastic welding.

As an alternative to the use of electrical filaments described in relation to FIGS. 8-11, the heating means 20 may comprise electromagnetic susceptor material or a plurality of magnetic particles as illustrated schematically in FIG. 12. The susceptor material or magnetic particles may be provided: within the thermoplastic laminate layers; as a surface coating on the thermoplastic layers; or within an adhesive provided between the thermoplastic layers.

Where the heating means comprises susceptor particles, heating is achieved by applying an RF (radio frequency) or MW (microwave) emission to the liner 1. The RF/MW emissions are absorbed by the susceptor material. Accordingly, the susceptor material is heated and heat is transferred by conduction to the liner 1.

Figure 13A:
Figure 13B:
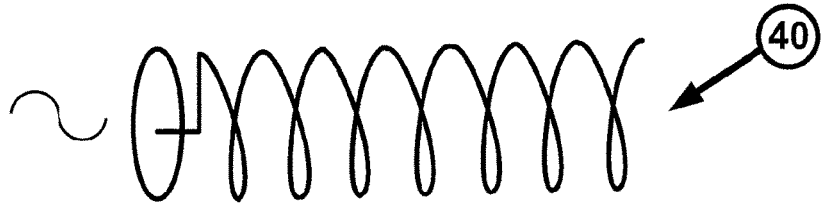
Figure 13C:
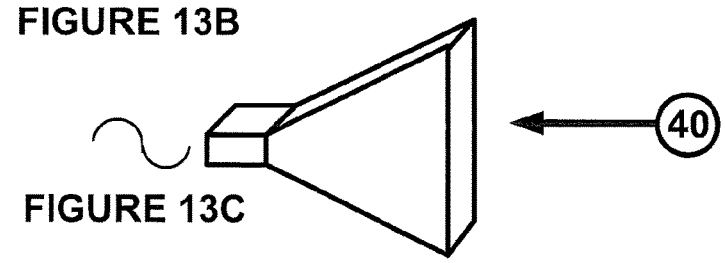

The emissions may be applied by an antenna 40 inserted into the liner 1. The antenna 40 can then be passed along the liner 1, successively heating the liner 1 for/during pressing. Some examples of suitable antenna forms are shown in FIG. 13, specifically a quarter wave antenna (FIG. 13*a*), a helical coil (FIG. 13*b*) and a horn antenna (FIG. 13*c*).

Where the heating means comprises magnetic particles, heating is achieved by applying a high frequency magnetic field to the pipe liner 1. The high frequency magnetic field causes heating of the magnetic particles due to hysteresis losses. Accordingly, heat is transferred by conduction to the liner 1. When the magnetic particles are heated above their curie temperature, they no longer exhibit magnetic properties and accordingly cease to be heated by the applied high frequency magnetic field. By selecting the curie temperature of the particles to correspond to the transition temperature of the laminate layers 11, heating of the pipe liner 1 may be controlled.

The high frequency magnetic field may be applied by an antenna 40 inserted into the liner 1. The antenna 40 can then be passed along the liner 1, successively heating the liner 1 for/during pressing. An example of a suitable antenna form is shown in FIG. 14, specifically a spiral coil.

The heating and pressing of the liner 1 in these embodiments may be carried using a similar arrangement to the electrical embodiment of FIG. 11 as is illustrated in FIG. 15. In this figure, a length of pipe liner is once again sealed by drum sections 33 at either end. Air can be pumped into the sealed volume using air inlet valve 37, thereby enabling the liner 1 to be pressed against the inside surface of the pipe.

The antenna 40 is provided within a shielded portion 42 of a pig (pipeline inspection gauge) 41. The pig 41 can be pulled from one end of the liner 1 to the other by means of a tow cable 43 which passes through gland 38 in one of the drum sections 33. A power cable 44 passes through an equivalent gland 38 at the other drum section 33.

In use, the liner section 1 is sealed and air is pumped inside. The antenna 40 is activated and pulled along by means of tow cable 43. The pipe liner 1 is thus heated by the antenna 40 in conjunction with the heating means 20, and pressed against the pipe by the pressure within the sealed liner 1. After sufficient heating and pressing, the liner can be allowed to cool in place. Subsequently, the air inlet valve 37 can be opened and/or the drum sections 33 removed. Successive lengths of pipe liner 1 may be installed within a long pipe in this fashion. After installation, adjacent lengths of liner 1 may be sealed together by any suitable method, in particular by plastic welding.

In some such embodiments, the pig 41 may additionally comprise one or more sprung plates 45 adapted to press outwardly on the liner 1. In such embodiments, it is indeed possible to omit the drums 33 and rely solely on the sprung plates 45 to press the heated liner 1.

In embodiments where the heating means 20 is susceptor material, the pig may also be provided with an infra red sensor (not shown). The infra red sensor may be operable to determine the temperature of the pipe liner 1 and hence the power output of antenna 40 can be varied in response to temperature.

The above embodiments are described by way of example only. Many variations are possible without departing from the scope of the invention as defined in the appended claims.

The invention claimed is:

1. A pipe liner for use in repair and/or renewal of a pipe, the pipe liner comprising an elongate duct formed from multiple laminated layers of thermoplastic material wherein heating means are provided between successive laminate layers and comprise an electromagnetic susceptor material adapted to heat the pipe liner above the transition temperature of the laminate layers.

2. A pipe liner as claimed in claim 1 wherein the laminate layers are bonded together by the provision of an adhesive there between or are heat bonded.

3. A pipe liner as claimed in claim 1 wherein the laminate layers are helically wound relative to the elongate axis.

4. A pipe liner as claimed in claim 1 wherein the laminate layers are formed from dual-orientated polymer (DOP) strips.

5. A pipe liner as claimed in claim 1 wherein the liner is adapted to comprise a cable duct provided between two laminate layers.

6. A pipe liner as claimed in claim 5 wherein the cable duct is formed from a thermoplastic material having a higher transition temperature than the thermoplastic material forming the laminate layers.

7. A pipe liner as claimed in claim 1 wherein the susceptor material comprises a plurality of susceptor particles provided: within the thermoplastic laminate layers; as a surface coating on the thermoplastic layers; or within an adhesive provided between the thermoplastic layers.

8. A method of installing a pipe liner of the type comprising an elongate duct formed from multiple laminated layers of thermoplastic material wherein heating means are provided between successive laminate layers and comprise an electromagnetic susceptor material adapted to heat the pipe liner above the transition temperature of the laminate layers or a plurality of magnetic particles adapted to have a curie temperature corresponding to the transition temperature of the laminate layers, the method comprising the steps of: inserting the pipe liner into the pipe; heating the pipe liner; and subsequently pressing the pipe liner against the interior surface of the pipe.

9. A method as claimed in claim 8 wherein the liner is adapted to comprise a cable duct and the method includes the step of laying a cable along the cable duct.

10. A method as claimed in claim 8 wherein the method includes the step of inserting successive lengths of pipe liner into the pipe and fusing together lengths of pipe liner.

11. A method as claimed in claim 8 wherein the pressing step is achieved using compressed air or other suitable gas.

12. A method as claimed in claim 8 wherein the pressing step is achieved using a forming tool inserted into the liner and the forming tool is operable to activate the heating means in the pipe liner.

13. A method as claimed in claim 8 wherein the method includes the additional step of monitoring the temperature of the pipe liner during heating.

14. A method as claimed in claim 8 wherein the heating means comprise susceptor material, and the heating is achieved by applying radio-frequency (RF) or microwave (MW) emissions to the pipe liner.

15. A method as claimed in claim 8 wherein the heating means comprise a plurality of magnetic particles adapted to have a curie temperature corresponding to the transition temperature of the laminate layers and the heating is achieved by applying a high frequency magnetic field to the pipe liner.

16. A forming tool for installing a pipe liner of the type comprising an elongate duct formed from multiple laminated layers of thermoplastic material and heating means provided between successive laminate layers comprising electromagnetic susceptor material adapted to heat the pipe liner above the transition temperature of the laminate layers, the tool comprising: emitting means operable to apply radio frequency (RF) or microwave (MW) emissions to the pipe liner.

17. A forming tool as claimed in claim 16 wherein the emitting means is operable to vary the power of the emissions.

18. A forming tool as claimed in claim 16 wherein the tool comprises an infra red detector positioned so as to monitor infra red emission from the liner.

19. A forming tool as claimed in claim 16 wherein the emitting means comprise any of: an RF amplifier and frequency source; a magnetron; an antenna aligned with the axis of the pipe.

20. A forming tool for installing a pipe liner of the type comprising an elongate duct formed from multiple laminated layers of thermoplastic material and heating means provided between successive laminate layers comprising a plurality of magnetic particles adapted to have a curie temperature corresponding to the transition temperature of the laminate, the tool comprising: magnetic means operable to apply a high frequency magnetic field to the pipe liner.

21. A forming tool as claimed in claim 20 wherein the magnetic means comprises any of: a conductive coil; a spiral coil; a pancake coil or multiple coils.

22. A pipe liner for use in repair and/or renewal of a pipe, the pipe liner comprising an elongate duct formed from multiple laminated layers of thermoplastic material wherein heating means are provided between successive laminate layers and comprise a plurality of magnetic particles adapted to have a curie temperature corresponding to the transition temperature of the laminate layers.

23. A pipe liner as claimed in claim 22 wherein the magnetic particles are provided: within the thermoplastic laminate layers; as a surface coating on the thermoplastic layers; or within an adhesive provided between the thermoplastic layers.

* * * * *